Aug. 9, 1966  A. MARTY  3,264,886
DRIVE- AND CONTROL-GEAR OF MACHINES FOR THE FORMING
OF WORK PIECES WITHOUT CUTTING
Filed July 2, 1964  3 Sheets-Sheet 1

INVENTOR.
Albert Marty
BY Michael S. Striker
Attorney

United States Patent Office 3,264,886
Patented August 9, 1966

3,264,886
DRIVE- AND CONTROL-GEAR OF MACHINES FOR THE FORMING OF WORK PIECES WITHOUT CUTTING
Albert Marty, Ibach, Switzerland
Filed July 2, 1964, Ser. No. 379,933
Claims priority, application Switzerland, July 9, 1963, 8,503/63
4 Claims. (Cl. 74—40)

The present invention relates to a drive- and control-gear of machines for the forming of work pieces without cutting by means of a tool whose rectilinear to-and-fro movement is derived from a continuously rotating crankshaft.

It is a primary object of my invention to provide a drive- and control-gear of the kind referred to which allows said tool to approach the working position, in which it engages the work piece to be formed, with a progressively reduced translational speed but increasing working force, and after passing through the dead center position to be withdrawn from said working position at a progressively increasing translational speed and reduced working force.

With these and other objects in view which will become apparent later from this specification and the accompanying drawings, I provide a drive- and control-gear for machines for the forming of work pieces without cutting comprising in combination: a base, a support carriage guided for rectilinear reciprocating movement on said base, a first crankshaft and a second crankshaft both journalled on said carriage rotatably about axes transverse of the direction of reciprocating movement of said carriage, a tool in operation forming the work piece without cutting mounted for reciprocating action on said base, connecting means linking said first crankshaft with said base, a linkage linking said stem with said second crankshaft, gearing connecting said two crankshafts with one another synchronously and in the same sense of rotation with a phase difference, and a driving motor in operation continuously driving said crankshafts.

Figure 1:
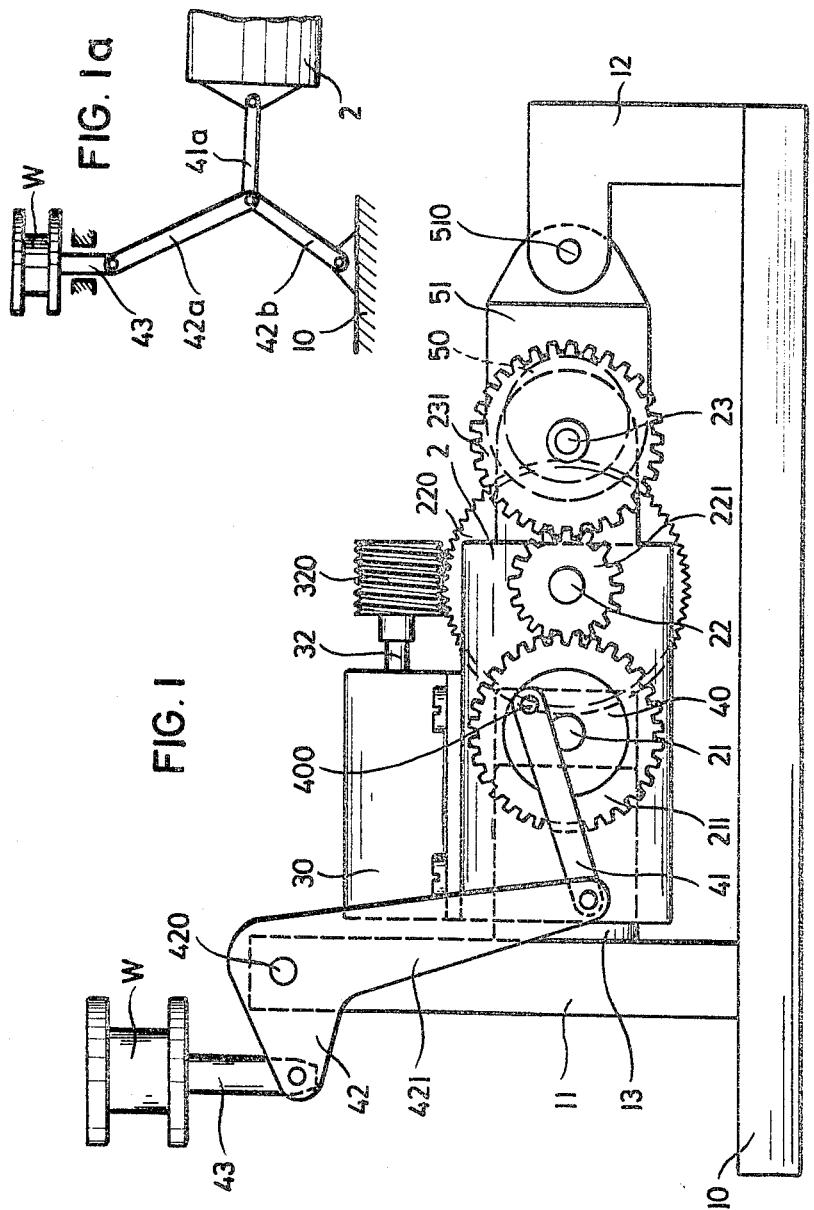
Figure 2:
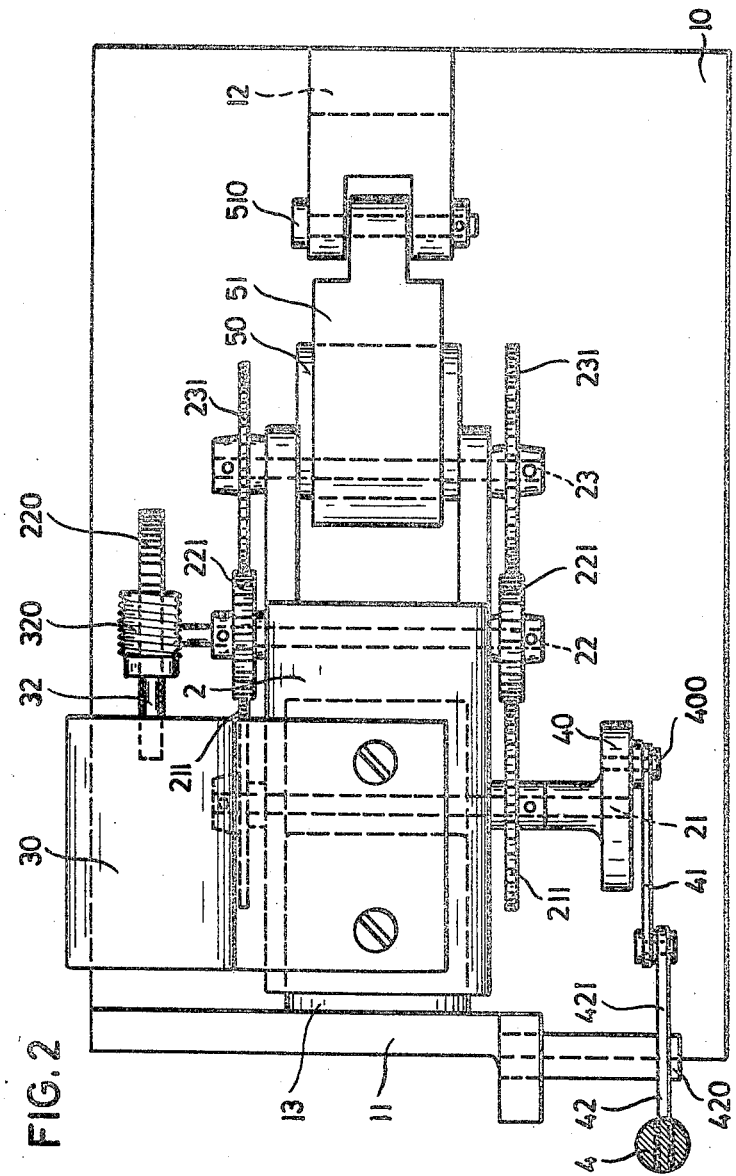

These and other features of my said invention will be clearly understood from the following description of a preferred embodiment thereof given by way of example with reference to the accompanying drawings, in which:

FIG. 1 is a side elevation,
FIG. 1a a variant to FIG. 1,
FIG. 2 a plan view, and
FIGS. 3–7 a working diagram subdivided in phases.

According to FIGS. 1 and 2, a rigid machine frame comprises a base 10, two uprights 11, 12 and a guide bar 13 fixed cantilever-fashion on the upright 11 above the base 10, said guide bar serving as a guide for a support carriage 2, which is rectilinearly movable to-and-fro on it. In this support carriage 2 three horizontal shafts 21, 22, 23 are journalled rotatably side by side transversely of the direction of sliding. The shaft 22 in the middle carries a worm wheel 220 and two spur gears 221, which are rotationally fixed to it.

The worm wheel 220 is continuously driven by a worm 320 mounted on the output shaft 32 of an electric motor 30 which is likewise fixed to the support carriage 2.

The spur gears 221 mesh on the one hand with spur gears 211 keyed to the shaft 21, and on the other hand with identical spur gears 231 keyed to the shaft 23. Spur gears 211 and 231 may be disengaged from spur gear 221 by known means, for instance, by axially moving the spur gear 221 along shaft 22. On the shaft 21 moreover a crank disc 40 is keyed, in which a pivot 400 for one end of a transmission link 41 is eccentrically inserted. The other end of the link 41 is pivotally connected with the longer leg 421 of an actuating lever 42 for a stem 43, said lever being journalled on the upright 11, and said tool being slidable rectilinearly up-and-down. Alternatively said tool 43, which serves for the forming of a work piece W without cutting could co-operate through a knee joint 42a, 42b with a link 41a, whereat this link 41a is linked at the carriage (FIG. 1a).

The shaft 23 is fixedly connected for rotation with an eccentric disc 50 eccentrically mounted thereon, which is rotatably mounted on a lever 51 pivotally supported on the upright 12 at 510.

The manner of functioning of the drive- and control-gear illustrated in FIGS. 1 and 2 follows from the functional diagram of FIGS. 3–7. It will be seen from these figures, that with the shaft 221 rotating continuously the crankpivot 400 performs an oscillating movement in the horizontal direction in accordance with the formula $$w_h = a \cdot \sin \cdot \omega t + b \cdot \sin \cdot (\omega t + \varphi)$$

while in the vertical direction it performs an oscillating movement in accordance with the formula $w_s = a \cdot \cos \cdot \omega t$, wherein $a$ denotes the eccentricity of the crank pivot 400 with respect to the axis of the shaft 21, $b$ denotes the eccentricity of the eccentric disc 50 with respect to the shaft 23, $\omega$ denotes the circular frequency of the shafts 21 and 23, and $\varphi = 90°$ the angular phase difference between the crank drives on the shaft 21 and on the shaft 23.

Figure 3:
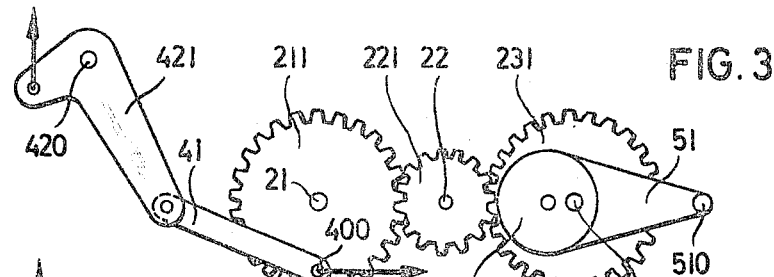
Figure 4:
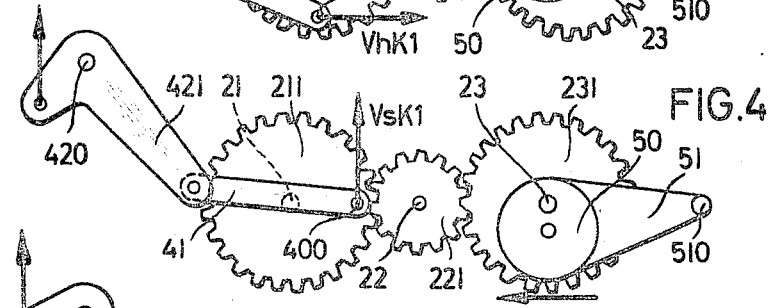
Figure 5:
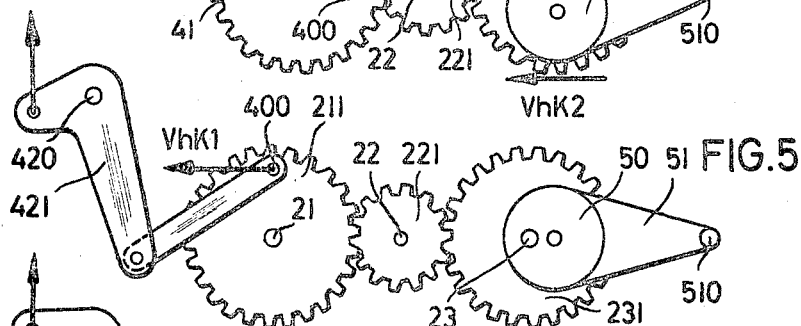
Figure 6:
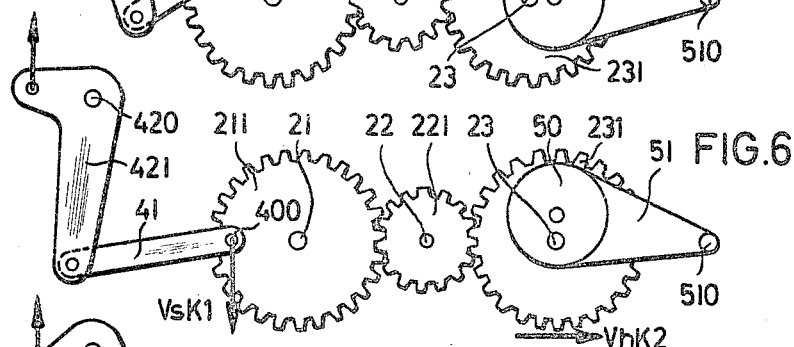
Figure 7:
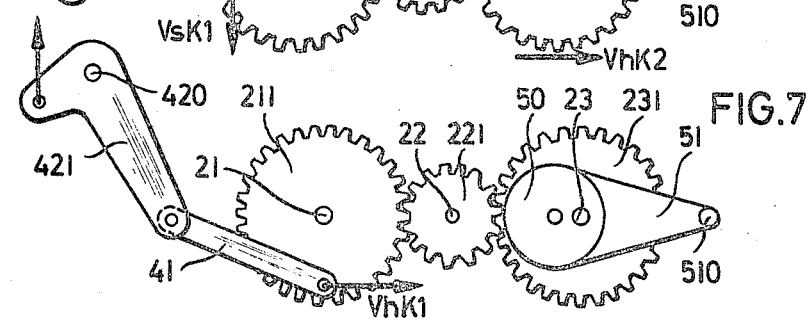

The extreme horizontal velocities $\pm V_h K_1$ of the crank drive on the shaft 21 are indicated by arrows in the FIGS. 3, 5 and 7 and the extreme vertical velocities $\pm V_s K_1$ of the same crank drive are likewise indicated in the FIGS. 4 and 6. Likewise the only effective, horizontal velocities $\pm V_h K_2$ of the eccentric disc 50 on the shaft 23 are indicated in the FIGS. 4 and 6.

$K_1$ and $K_2$ represent constants for a certain setting of the machine.

The following is a more detailed explanation:

Gear 221 drives gear 211 and gear 231 at a constant speed, which depends on the speed of the drive motor. Consequently, $K_1$ and $K_2$ are dependent on the speed of the motor.

The distance of the pivot 400 from the shaft 21 and the eccentricity of the eccentric disc 50 influence the speed of the carriage and of the actuating lever and consequently also influence the constants $K_1$ and $K_2$.

For a certain setting of the machine the speed of the motor, the distance of the pivot 400 from the shaft 21 and the eccentricity of the eccentric disc 50 remain unchanged.

These values can easily be calculated for a certain setting of the machine and these values are represented by the constants $K_1$ and $K_2$ for that respective setting of the machine.

Depending on the choice of the ratio $a:b$ in the two formulae herein above and of the phase difference $\varphi$ selected, which in accordance with FIGS. 3 to 7 amounts to 90°, the characteristic of movements of the crank pivot may be varied. For this purpose preferably the spur gears 221 may be shifted out of mesh with the gears 211 and 231, in order to adjust the rotational positions of these gears stepwise independently of one another and thus to adjust the effective phase difference $\varphi$ to another value.

Likewise it is readily feasible, to adjust stepwise the eccentricity of the crank pivot 400 with respect to the shaft 21 for example by exchanging the crank disc 40.

In principle in the dead centre positions of the tool 43, whose movements are derived from the crank disc 40, the eccentric drive mechanism 23–50–51–12 produces the required force for overcoming the dead centre positions in which the tool is practically at a standstill.

In such an embodiment one can use a drive motor 30 of comparatively small dimensions, and yet obtain the desired characteristic of movements and forces of the working tool 43.

If it is preferred to mount the motor stationarily, movement-transmitting members, which are movable to-and-fro with the carriage along the motor shaft, e.g. worm wheels, may enforce the drive of the carriage.

While I have described herein and illustrated in the accompanying drawings what may be considered a typical and particularly useful embodiment of my said invention, I wish it to be understood that I do not limit myself to the particular details and dimensions described or illustrated; for obvious modifications will occur to a person skilled in the art.

What I claim as my invention and desire to secure by Letters Patent is:

1. A drive- and control-gear for machines for the forming of work pieces without cutting, comprising in combination: a base, a support carriage guided for rectilinear reciprocating movement on said base, a first crankshaft and a second crankshaft both journalled on said carriage rotatably about axes transverse of the direction of reciprocating movement of said carriage, a tool for forming a work piece, said tool being mounted on said base for reciprocating movement relative thereto, connecting means linking said first crankshaft with said base, a linkage linking said tool with said second crankshaft, gearing connecting said two crankshafts with another synchronously and in the same sense of rotation with a phase difference, and a driving motor in operation continuously driving said crankshafts.

2. A drive- and control-gear as claimed in claim 1, wherein at least one of said crankshafts has an eccentric disc whose eccentricity forms the throw of the crank.

3. A drive- and control-gear as claimed in claim 1, wherein said driving motor is mounted on said carriage and in operation takes part in the reciprocating movement thereof.

4. A drive- and control-gear as claimed in claim 3, also comprising a worm in operation driven by said motor, a worm wheel in mesh with said worm, a shaft journalled in said carriage transversely of the direction of reciprocation movement thereof, said worm wheel being keyed to said shaft; and wherein said gearing comprises a first spur gear keyed to said first crankshaft, a second spur gear keyed to said second crankshaft and a third spur gear mounted on said shaft to which said work wheel is keyed, said third spur gear being shiftable on said shaft between a first position in which it meshes with said first and second spur gear and a second position in which it is disengaged from said first and second spur gear, thereby disconnecting said two crankshafts from each other, so as to allow their rotational adjustment relative to one another for varying the phase difference between said two crankshafts.

References Cited by the Examiner

UNITED STATES PATENTS

| | | | |
|---|---|---|---|
| 637,020 | 11/1899 | Owen | 74—40 X |
| 2,919,653 | 1/1960 | Morris | 74—44 X |

FRED C. MATTERN, Jr., *Primary Examiner.*

BROUGHTON G. DURHAM, *Examiner.*

D. H. THIEL, *Assistant Examiner.*